US008907009B2

(12) United States Patent
Otto et al.

(10) Patent No.: US 8,907,009 B2
(45) Date of Patent: Dec. 9, 2014

(54) METHOD FOR PRODUCING POLYMERS WITH A NEUTRAL COLOR TONE

(75) Inventors: Brigitta Otto, Milow (DE); Rainer Linke, Butzbach/Bodenrod (DE); Oliver Schmidt, Langenselbold (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 1105 days.

(21) Appl. No.: 12/549,504

(22) Filed: Aug. 28, 2009

(65) Prior Publication Data
US 2010/0052202 A1 Mar. 4, 2010

(30) Foreign Application Priority Data
Aug. 29, 2008 (DE) .......................... 10 2008 044 487

(51) Int. Cl.
*C08G 63/60* (2006.01)
*C08L 67/00* (2006.01)
*C08L 73/00* (2006.01)
*C08L 77/00* (2006.01)
*C08G 63/78* (2006.01)
*C08G 63/91* (2006.01)
*C08K 5/00* (2006.01)

(52) U.S. Cl.
CPC .............. *C08G 63/78* (2013.01); *C08G 63/916* (2013.01); *C08K 5/0041* (2013.01)
USPC ........... 524/599; 524/601; 524/604; 524/714; 524/715

(58) Field of Classification Search
CPC ......... C08G 63/78; C08J 3/20; C08K 5/0041; C08K 3/0033
USPC .......................... 524/599, 601, 604, 714, 715
See application file for complete search history.

(56) References Cited

U.S. PATENT DOCUMENTS

| 4,122,107 | A | | 10/1978 | Kenney ..................... 260/429.3 |
|---|---|---|---|---|
| 4,499,226 | A | * | 2/1985 | Massey et al. ................ 524/382 |
| RE32,765 | E | | 10/1988 | Callander et al. ............. 524/382 |
| 5,023,367 | A | | 6/1991 | Calbo, Jr. et al. ............. 560/193 |
| 5,372,864 | A | | 12/1994 | Weaver et al. ............. 428/63.92 |
| 5,534,564 | A | * | 7/1996 | Zhong et al. .................. 523/340 |
| 5,618,908 | A | * | 4/1997 | Vosa .............................. 528/288 |
| 5,688,899 | A | | 11/1997 | Strand et al. .................. 528/279 |
| 6,793,083 | B2 | | 9/2004 | Kulkarni et al. .............. 215/400 |
| 7,462,682 | B2 | | 12/2008 | Tsukamoto |
| 2005/0131202 | A1 | * | 6/2005 | Fujimori et al. .............. 528/272 |
| 2005/0245677 | A1 | | 11/2005 | Tsukamoto ................... 524/601 |
| 2007/0155947 | A1 | | 7/2007 | Fujimori et al. .............. 528/272 |

FOREIGN PATENT DOCUMENTS

DE 2705230 8/1978

OTHER PUBLICATIONS

Lin Hai: Study of fluorescent whitening agent and shading dyes on paper whitening: China Pulp & Paper, No. 4, 1998, pp. 18-22 (original & English translation).

* cited by examiner

*Primary Examiner* — Peter F Godenschwager
*Assistant Examiner* — Jane L Stanley
(74) *Attorney, Agent, or Firm* — Lucas & Mercanti, LLP; Jonathan Myers

(57) ABSTRACT

A method is disclosed for producing polymers with a neutral color tone, wherein a blue and red dye are added before entry into the last polyreaction stage, wherein adjustment of a neutral color tone of the polymer, using a total dye concentration in the polymer of no more than 3 ppm and a proportion of the blue dye in the resulting dye mixture of at least 50% by weight, occurs through independent adjustment of a and b color values in the Lab color space by determination of a and b color values of the polymer without addition of dyes, establishment of the total dye concentration depending on the b-value shift to be achieved, establishment of the required mixture ratio of the colors red and blue depending on the a-value shift to be achieved, and metering of the established content of dye mixture into the reaction mixture.

15 Claims, No Drawings

METHOD FOR PRODUCING POLYMERS WITH A NEUTRAL COLOR TONE

CROSS REFERENCE TO RELATED APPLICATIONS

This application claims the benefit of the priority of German Patent Application DE 10 2008 044 487.1 filed 29 Aug. 2008, the contents of which are expressly incorporated herein.

FIELD OF THE INVENTION

The invention relates to a method for producing polymers with a neutral color tone. The special feature of the method lies in the possibility of correcting the a and b color values in the Lab color space of the polymer independently of one another. Furthermore, a reduction of the metal content of the polymer is achieved through the preferred use of organic dyes and the omission of cobalt as a colorant component.

BACKGROUND OF THE INVENTION

During the production of polymers in general and polyesters in particular, as is known, thermal and oxidative degradative reactions also take place at the same time, through which chromophoric groups are formed in the polymer molecules. These lead to a yellowish discoloration of the polymer (see e.g., "Polyesterfasern, Chemie und Technologie," Dr. Hermann Ludewig, Akademie-Verlag, Berlin, 1975; "Modern Polyesters: Chemistry and Technology of Polyesters and Copolyesters," John Scheiers and Timothy E. Long (Ed.), John Wiley & Sons, 2003). This slight yellow coloration can also be detected well metrologically. If no dye is added to the polyester during production, the b color value then measured (Hunter Method) is between 2-4 units.

There are essentially two possibilities for minimizing degradative reactions of this type, namely working under a protective gas atmosphere and lowering the reaction temperature. While the former can still be realized with reasonable expenditure, the latter is possible only to a limited extent. Since the temperature is an essential factor for the reaction velocity, it has to be carefully considered how far a temperature reduction or the color improvement achieved thereby is still associated with a technically and economically reasonable reaction velocity. There has therefore been no lack of attempts to prevent a color error in the product. One established method for this polymer color technology requires the use of blue dyes. Through the addition of a suitable quantity of blue dye, the yellow base tone of the polymer is shifted to a visual impression neutral in color. The neutral color shade is particularly important for packaging materials, in particular for foodstuffs and beverages.

Cobalt compounds often used in dye technology, in particular cobalt acetate, are known as blue colorants, which as a rule are used jointly with organic dyes. However blue, red and violet organic dyes are also used alone.

For example, the use of cobalt compounds is disclosed in EP 0 061 414, where a production method for a polyester resin is described, which contains a cobalt compound, a phosphorous compound and an antimony compound, and is used for producing articles with high clarity and a neutral color tone. The cobalt compound is the colorant component therein, the phosphorous compound is used to suppress the catalytic effect of the cobalt compound, and the antimony compound is used as a catalyst for the polycondensation.

U.S. Pat. No. 6,793,083 describes the production of a clear polyester neutral in color using a preblend of cobalt and phosphorous which is added to the production process either at the end of the esterification stage or at the start of the polycondensation stage. Here, too, cobalt is the colorant component and phosphorous is the stabilizer for cobalt.

A general description of the use of organic dyes for adjusting the color neutrality in polyesters is found, for example, in "Polyester Bottle Resins: Production, Processing, Properties and Recycling," Dr. Ulrich K. Thiele, PETplanet Publisher GmbH, Heidelberg, 2007.

EP 0 854 160 discloses a diethylene glycol modified PET copolymer of improved clarity with which cobalt compounds, mixtures of blue and red anthraquinone derivatives and isoquinoline derivatives are used as colorants for color adjustment.

U.S. Pat. No. 5,372,864 discloses different blue and red anthraquinone derivatives and anthrapyridone derivatives which can be used as dye mixtures in order to adjust a neutral or slightly bluish color in polyesters. The thermally stable dyes can thereby also carry reactive groups that make it possible to bond the dyes to the polyester during the polycondensation. The yellowing is thereby corrected via the quantity of color mixture used, a coloring in the red-green direction can be equalized by means of the composition of the color mixture. However, there is no separate consideration here of the b value of the polymer in the L, a, b color space (measured according to Hunter), which is a gauge of the yellowing, and of the a value, which characterizes a red-green shift. It is not indicated either how the a and b values are to be influenced in a targeted manner separately from one another, or it is not even possible due to the concentrations provided. The determination of dye composition and quantity for the most exact possible neutralization of a color tone in the polymer accordingly always requires considerable testing expenditure, since the a value achieved changes with the b value or the dye mixtures and quantities used for that purpose. According to the Hunter L,a,b color scale, "L" has a value of 0 to 100 and is a measure of reflecting light diffusion, the values "a" and "b" have no numerical limits, positive "a" is red, negative "a" is green, positive "b" is yellow, and negative "b" is blue.

The known cobalt compounds as colorants, of which in particular cobalt acetate is used for foodstuff packaging, have a number of disadvantages. In addition to its property as a blue-violet colorant, cobalt also has catalytic properties and is used among other things as a esterification catalyst. However, this property is undesirable in the use of cobalt as a colorant. The cobalt compound is therefore stabilized with the addition of a stabilizer, e.g., phosphorous from phosphoric acid, and the catalytic reaction of the cobalt is thus suppressed as far as possible. However, at the same time the formation and precipitation of cobalt phosphates is possible, which in turn causes an increase in the turbidity values in the polymer. Particularly for packaging materials, in particular beverage bottles, a turbidity of this type is naturally unacceptable. Furthermore, an elimination of acetic acid from the cobalt acetate often uses can lead to attacks on the reactors, pipelines and the distillation.

The food regulations, which completely exclude certain compounds or at least limit the concentration thereof, are another problem. This problem applies not only to cobalt compounds but also to organic dyes. Only recently have colorants that have international food approvals been increasingly developed and introduced to the market. Until now a freely selectable color design without concessions to the colors L, a and b (according to Hunter) and the turbidity values in the polymer has therefore hardly been possible.

Today increasing importance is also attached to the lowest possible metal content in polymers for foodstuff packaging. Although the food regulations do not stipulate the total metal content, attempts are made to circumvent problems with the migration of metals into the foodstuff. It is therefore advantageous if the cobalt compounds can be replaced by organic dyes. However, in the past only the b value could be adjusted very exactly with the use of blue/red dye combinations. The development of the a value and the L value then resulted from the dye combination. An independent adjustment of the a and b value was not possible.

OBJECTS OF THE INVENTION

An object of the present invention is to find a method for color neutralization in polymers in general and polyesters in particular, which makes it possible to design the colors L, a and b in the Hunter Scale to be adjustable independently of one another as much as possible and at the same time to clearly improve the turbidity values of the polymer as well.

A further object of the invention is to provide polymers, especially polyester polymers, which comply as much as possible with the regulations provided throughout the world for packaging, including food packaging, while at the same time keeping costs to a minimum.

SUMMARY OF THE INVENTION

The objects are attained through the method according to the invention for producing polymers with a neutral color tone in one or more reaction stages, wherein a blue and/or red dye is added to the process at a point before entry into the last polyreaction stage, characterized in that the adjustment of a neutral color tone of the polymer, which is carried out with a total dye concentration in the polymer of no more than 3 ppm, preferably no more than 2 ppm, particularly preferably no more than 1 ppm and a proportion of the blue dye in the dye mixture of at least 50% by weight, occurs through the independent adjustment of the a and b color values in the Hunter L, a, b color space and comprises the following steps:

Determination of the a and b color values of the polymer without the addition of dyes;
Establishment of the total dye concentration depending on the b value shift to be achieved;
Establishment of the required mixture ratio of the colors red and blue depending on the a value shift to be achieved;
Metering of the established content of dye mixture into the reaction mixture.

The preferred polymer is a polyester although polyethylene, polypropylene, polyurethane, polyvinylchloride, polyacrylamide, polyacrylester, and polycaprolactam may be employed. The preferred polyester is polyethylene glycol terephthalate (PET), but also included specifically within the scope of polyester are polytrimethylterephthalate (PTT), and polybutylene terephthalate (PBT).

In a particularly preferred embodiment variant the method is a method for producing polyesters with neutral color tone, which comprises the reaction stages:

At least one esterification/transesterification stage in which one or more dicarboxylic acids and/or one or more dicarboxylic acid esters are esterified/transesterified with one or more at least bifunctional alcohol;
At least one prepolycondensation stage in which the esterification/transesterification product is polycondensed to low molecular weights; (e.g. PET with an intrinsic viscosity of 0.60 to 0.65 dl/g which corresponds to a molecular weight of 16,554 to 18,693 g/Mol.):
At least one final polycondensation stage in which the prepolycondensation product is polycondensed to a high-molecular polyester end product (e.g. PET with an intrinsic viscosity of 0.78 to 0.85 dl/g which corresponds to a molecular weight of 24,657 to 28,094 g/Mol.).

It was found that when a neutralization of the visual color impression of a polymer, in particular of a polyester, is carried out with the addition of very small quantities of the two dye components blue and red or the mixture thereof, surprisingly the b value as well as the a value of the polymer can be adjusted in a targeted manner and independently of one another, but the L value then results inevitably from the composition. The total dye concentration is hereby a maximum of 3 ppm, preferably a maximum of 2 ppm, particularly preferably a maximum of 1 ppm. The adjustment of the b value is thereby made via the total quantity of dyes, wherein the b value decreases with increasing total concentration. The a value is in turn adjustable via the ratio of the blue/red components. With a mixture ratio of 80-85% by weight blue to 20-15% by weight red, the a value in the polymer remains unchanged. All other mixture ratios of blue to red can be used for the adjustment of the a value. However, the proportion of blue in the mixture must be at least 50% by weight so that the adjustment of the a and b value remains independent of one another even with higher total dye concentrations. The L value cannot be controlled in a targeted manner, but depends mainly on the dye quantity added. To a much lower extent it is also influenced by the mixture ratio of the dyes. With an addition of less than 1 ppm of dye, the L value remains virtually unchanged. In the range of 1-3 ppm the decrease in the L value increases from 2 to 10 units with a measurement of polyester chips. With a comparative measurement of grinding material, an identical development of the measured color values is shown with absolute values changed according to the changed specimen figuration.

In a preferred embodiment variant the dyes used are organic dyes, in particular anthraquinone derivatives. A source of metal in the polymer is thus removed due to the replacement of the cobalt compounds otherwise usual as colorants and the lack of other metals in the organic dyes. In addition to the food-relevant aspect, a price reduction for the polymer is also hereby achieved in two respects. On the one hand the cobalt, which is dosed much higher compared to the dyes, is omitted and on the other hand it is possible to thereby reduce the content of phosphorous compounds since they then are required in a quantity of approx. 10 ppm only for thermal stabilization in the polycondensation process and no longer additionally have to stabilize the cobalt compound.

Furthermore, the organic dyes particularly preferably have at least one reactive group by means of which they can be bonded covalently to the polymer. Analogous to an internal plasticization, the dyes can thereby be prevented from later being able to diffuse out of the polymer and migrate into packaged goods. If the dyes are not equipped with reactive groups, they are at least selected such that they are characterized by a particularly good solubility in the polymer and an extremely low tendency to migration associated therewith.

A color shift can be achieved with the colors from the group of the red and blue anthraquinone dyes, which are described in further detail in the examples, with a ratio of blue to red of 80:20, which color shift is comparable to a standard color mixture currently available on the market of 15 ppm Co and 0.3 ppm dye Solvent blue Color Index 104 with the aim of $\Delta b=3-4$ and $\Delta a \approx 0$ (measured on chips).

With the dye system according to the invention it is possible to change from an existing process with cobalt colorant directly to the dye mixture without a transitional product. A specially installed mixing tank for the cobalt components can then be omitted. When cobalt is omitted, the turbidity values of the polymer are also improved, since precipitations of cobalt phosphate can no longer occur. The dye system is not limited in its use to a specific catalyst, but functions with antimony, titanium as well as mixed catalysts of antimony and titanium. Here, too, a change is possible between the individual catalysts without transitional products. A color tone once set is also retained after the change if the coloration of the polymers is not changed by the change-over.

Further embodiment variants provide the metering of the dyes at different stages during the process. Thus the dyes can either be added to the educt paste, which is fed to the esterification stage, or metered directly into the esterification stage. Furthermore, the dye mixture can be added together with the esterification product or also separately therefrom into the prepolycondensation stage. And finally metering into the final polycondensation stage is also possible, which is then carried out together with the prepolycondensation product.

To this end the dyes can be used as powder as well as a suspension and/or solution. According to a further claim, the suspension and/or solution has a dye concentration of no more than 0.5% by weight, preferably no more than 0.1% by weight, particularly preferably no more than 0.05% by weight. A good intermixing and distribution of the dyes in the reaction mixture is thereby ensured. A particularly advantageous variant is the metering of a solution and/or suspension of the dyes in the multi functional alcohol component used as a monomer unit—thus, e.g., in the case of PET as a solution and/or suspension in ethylene glycol—in the esterification/transesterification stage. The metering is carried out via conventional batchers, such as, e.g., gear pumps, at pressures up to a maximum of 10 barg.

If the colors are used as solution and/or suspension, a further preferred embodiment variant provides that they are continuously stirred or moved in circulation in order to prevent the formation of concentration gradients or, particularly in the case of suspensions, of mixture separations.

A polyester that has been produced according to the method according to the invention is particularly suitable for the production of packaging materials, in particular food packaging and beverage containers, and for the production of fibers. The intrinsic viscosity of PET for fibers is preferably between 0.63 and 0.65 dl/g. The intrinsic viscosity of PET for films is preferably between 0.70 and 0.85 dl/g.

EXAMPLES

The following examples from the field of polyesters are designed to illustrate the invention and are not to be understood in any way to be limiting.

The analytical methods described below were used for the determination of the quality features shown.

The measurement of intrinsic viscosity (IV) was carried out by means of a capillary tube viscometer according to Ubbelohde with a capillary of size 1c at 25° C. A solution of 500 mg polyester in 100 ml of a mixture of phenol and 1,2 dichlorobenzene in a ratio of 3:2 (parts by weight) was used.

The COOH end-group concentration was determined by means of photometric titration of a solution of the polyester in a mixture of o-cresol and chloroform (70:30 parts by weight) with 0.05 molar ethanolic potassium hydroxide solution against bromothymol blue.

The measurement of the turbidity value in "nephelometric turbidity units" (NTU) was carried out with a 10% by weight solution of the polyester in phenol/dichlorobenzene (3:2 parts by weight) with a nephelometer from Hach (Model XR, according to U.S. Pat. No. 4,198,161) in a cuvette with a diameter of 22.2 mm analogous to the standard DIN 38404, part 2 usual for water. The intensity of the scattered light is measured compared to a formazine standard solution minus the value from the solvent (approx. 0.3 NTU).

The measurement of the color values L and b was carried out according to Hunter. The polyester chips were first crystallized in the drying cabinet at 135±5° C. for one hour. The color values were then determined by measuring in a tristimulus colorimeter the color tone of the polyester sample with three photocells, ahead of which respectively one red, green and blue filter was placed (X, Y and Z values). The evaluation was carried out according to the Hunter's formula, wherein $$L = 10 \cdot \sqrt[2]{Y} \text{ und}$$

$$a = \frac{17.5}{\sqrt[2]{Y}} \cdot (1.02 \cdot X - Y) \text{ und}$$

$$b = \frac{7.0}{\sqrt[2]{Y}} \cdot (Y - 0.8467 \cdot Z)$$

The absolute error of the measured values for L is ±1 and for a and b is respectively ±0.3.

The examples can be described as follows:

Production of the 0.02% dye suspension

As a blue dye Solvent blue Color Index 104 and as a red dye Solvent red Color Index 52 from Lanxess, Germany were used for the tests. These dyes comply with the EU and FDA food regulations. They are approved for use in the production of packaging of foodstuffs.

Both dyes were mixed in ethylene glycol in a mixing tank with stirring at room temperature, the concentration was measured again, and subsequently left in a supply tank with stirrer for a continuous metering at room temperature. The metering into a continuously working production unit was carried out by means of a gear pump with a counter pressure of no more than 10 barg. On a bench scale the dye suspension was metered directly into the terephthalic acid (PTA)/ethylene glycol (EG) paste in a pressureless manner. The glycol content of the dye suspension is taken into consideration in the total glycol quantity to be metered.

Production of the Polyesters

For the tests a PTA/EG paste in the molar ratio of 1:1.8 was produced. To produce a copolymer for bottle PET, 2% by weight isophthalic acid as a powder was added to the paste with stirring, and this was placed in a 5 kg agitated autoclave. 200 ppm antimony (from antimony triacetate) as a catalyst and the 15 ppm Co from cobalt acetate used in the comparative test, which here are to act as a color component, were metered into the paste at the same time as the catalyst. The dye Solvent blue Cl 104 was likewise fed into the paste for the comparative test as 0.02% glycolic suspension.

The color mixtures used for the examples shown were weighed in according to the desired composition of Solvent blue Cl 104 and Solvent red Cl 52 and likewise added to the paste as 0.02% suspension in the agitated autoclave. The composition of the dye mixtures is shown in Table 1.

Subsequently, the paste with all of the additives, after heating to 200° C. within 120 min., was further heated to 230° C. with simultaneous increase in pressure up to 3.5 barg in a controlled manner, subsequently the pressure was relieved to normal pressure over 90 min. with simultaneous further temperature increase. Subsequently, 15 min. secondary reaction took place with a temperature increase of up to 265° C. Then 17 or, in example 5, 10 ppm phosphorous as 2% glycolic stabilizer solution in EG was metered to the esterification product. 85% phosphoric acid was selected as a stabilizer substance. Subsequently, the precondensation was carried out at 270° C. in two pressure stages, at 200 mbarg and at 50 mbarg over a period of 70 min. Subsequently the polycondensation was carried out with stirring at temperatures up to a maximum of 280° C. and under vacuum of 0.3-0.5 mbarg over a period of approx. 170 min. The most important quality parameters of the PET produced and the comparative examples are shown in Table 1 below.

TABLE 1

| Dye Formula [ppm] | Comp. Ex. 1 | Comp. Ex. 2 | Ex. 1 | Ex. 2 | Ex. 3 | Ex. 4 | Ex. 5 |
|---|---|---|---|---|---|---|---|
| Co | — | 15 | — | — | — | — | — |
| Solvent blue Cl 104 | — | 0.3 | — | — | — | — | — |
| P | 17 | 17 | 17 | 17 | 17 | 17 | 10 |
| Dye Mixture | | | | | | | |
| Solvent blue Cl 104 | — | — | 0.5 | 1.0 | 0.7 | 0.8 | 0.8 |
| Solvent red Cl 52 | — | — | 0.5 | 0.5 | 0.35 | 0.2 | 0.2 |
| Total | — | — | 1.0 | 1.5 | 1.05 | 1.0 | 1.0 |
| Ratio | — | — | 1:1 | 2:1 | 2:1 | 4:1 | 4.1 |
| Analyses | | | | | | | |
| IV [dl/g] | 0.61 | 0.611 | 0.610 | 0.619 | 0.612 | 0.613 | 0.625 |
| COOH [mmol/kg] | 10 | 11 | 12 | 13 | 12 | 13 | 13 |
| Color according to Hunter | | | | | | | |
| L | 83.3 | 82.6 | 83.4 | 81.3 | 83.1 | 83.3 | 82.9 |
| a | −1.7 | −1.4 | 0.7 | −0.1 | −0.6 | −1.7 | −1.8 |
| b | 1.6 | −1.1 | −2.5 | −4.5 | −2.6 | −2.6 | −2.4 |
| Turbidity [NTU] | 3.1 | 4.4 | 2.1 | 2.2 | 2.1 | 2.0 | 1.6 | weight blue to 20 to 15% by weight red, the a value in the polymer remains unchanged, and all other mixture ratios of blue to red can be used for adjustment of the a value; and (d) following steps (b) and (c) metering into a reaction mixture for forming the polymer at a point before entry into the last polyreaction stage, the dye mixture having the total dye concentration as defined in step (b) and the required dye mixture ratio of the red and blue dyes as defined in step (c), to independently adjust the a color value, if necessary, and the b color value in the Hunter l,a,b color space of the polymer, thereby obtaining the polymer with a neutral color tone.

What is claimed is:

1. A method for producing a polymer with a neutral color tone in which cobalt is omitted, suitable for making food packaging or beverage containers, in one or more reaction stages through independent adjustment of a and b color values in the Hunter l,a,b color space of the polymer, which comprises the steps of:
   (a) producing sample chips of the polymer and determining the a and b color values of the Hunter l,a,b color space of the sample polymer chips by measuring in a tristimulus colorimeter, the color tone of the sample polymer chips with three photocells, ahead of which respectively one red, green and blue filter was placed prior to any addition of a dye;
   (b) establishing a total dye concentration not exceeding 3 ppm and in which cobalt is omitted for the polymer depending on the b color value to be achieved following a b value shift, whereby the b value decreases with increasing total dye concentration;
   (c) mixing red and blue dyes in which cobalt is omitted to establish a required dye mixture ratio of the red and blue dyes for the polymer depending on the a color value to be achieved following an a value shift, where the proportion of the blue dye in the dye mixture is at least 50% by weight, whereby with a mixture ratio of 80 to 85% by 2. The method for producing a polymer with a neutral color tone defined in claim 1 wherein according to step (b) the total dye concentration established for the polymer does not exceed 2 ppm.

3. The method for producing a polymer with a neutral color tone defined in claim 1 wherein according to step (b) the total dye concentration established for the polymer does not exceed 1 ppm.

4. The polymer product with a neutral color, prepared by the method defined in claim 1.

5. A method for producing a polyester with a neutral color tone in which cobalt is omitted, suitable for making food packaging or beverage containers, through independent adjustment of a and b color values in the Hunter l,a,b color space of the polyester, which comprises the steps of:
   (i) esterifying or transesterifying, respectively, at least one dicarboxylic acid and/or at least one dicarboxylic acid ester with at least one bifunctional alcohol to obtain an esterification/transesterification product;
   (ii) polycondensing the esterification/transesterification product obtained according to step (i) to obtain a prepolycondensation oligomeric product; and
   (iii) polycondensing the prepolycondensation oligomeric product to obtain the polyester, wherein at any time during steps (i), (ii) or (iii) prior to completing step (iii), independently adjusting the a and b color values in the Hunter l,a,b color space of the polyester, according to the following steps:

(a) producing sample chips of the polyester and determining the a and b color values of the Hunter l,a,b color space of the sample polyester chips by measuring in a tristimulus colorimeter, the color tone of the sample polymer chips with three photocells, ahead of which respectively one red, green and blue filter was placed prior to any addition of a dye;

(b) establishing a total dye concentration not exceeding 3 ppm and in which cobalt is omitted for the polyester depending on the b color value to be achieved following a b value shift, whereby the b value decreases with increasing total dye concentration;

(c) mixing red and blue dyes in which cobalt is omitted to establish a required dye mixture ratio of the red and blue dyes for the polyester depending on the a color value to be achieved following an a value shift, where the proportion of the blue dye in the dye mixture is at least 50% by weight, whereby with a mixture ratio of 80 to 85% by weight blue to 20 to 15% by weight red, the a value in the polymer remains unchanged, and all other mixture ratios of blue to red can be used for adjustment of the a value; and (d) following steps (b) and (c) metering into the polyester reaction mixture in step (i), step (ii) or step (iii) at a point before completing step (iii), the dye mixture having the total dye concentration as defined in step (b) and the required dye mixture ratio of the red and blue dyes as defined in step (c), to independently adjust the a color value, if necessary, and the b color values value in the Hunter l,a,b color space of the polyester, thereby obtaining the polyester with a neutral color tone.

6. The method for producing a polyester with a neutral color defined in claim 5 wherein according to steps (b), (c) and (d) the red and blue dyes are both organic dyes.

7. The method for producing a polyester with a neutral color defined in claim 6 the red and blue dyes have at least one reactive group capable of bonding covalently to the polyester.

8. The method for producing a polyester with a neutral color defined in claim 5 wherein the addition of the red and blue dyes is made directly to an educt paste or directly to the esterification/transesterification during step (i).

9. The method for producing a polyester with a neutral color defined in claim 5 wherein the addition of the red and blue dyes is made to the prepolycondensation according to step (ii).

10. The method for producing a polyester with a neutral color defined in claim 5 wherein the addition of the red and blue dyes is carried out together with the prepolycondensation product in the final polycondensation stage according to step (iii).

11. The method for producing a polyester with a neutral color defined in claim 5 wherein according to step (d) the addition of the red and blue dyes is made as a solid.

12. The method for producing a polyester with a neutral color defined in claim 5 wherein according to step (d) the addition of the red and blue dyes is made as a suspension or as a solution.

13. The method for producing a polyester with a neutral color defined in claim 12 in that the suspension or solution has a dye concentration of no more than 0.5% by weight.

14. The method for producing a polyester with a neutral color defined in claim 12 in that the suspension or solution is continuously stirred or moved in circulation.

15. The polyester product with a neutral color, prepared by the method defined in claim 5.

* * * * *